US012772988B2

(12) United States Patent
Simonsen et al.

(10) Patent No.: US 12,772,988 B2

(45) Date of Patent: Oct. 27, 2026

(54) NON-TRANS FAT COMPOSITION WITH IMPROVED BLOOM STABILITY, GLOSS, AND MELTDOWN

(71) Applicant: AAK AB (PUBL), Malmö (SE)

(72) Inventors: Hannah Solati Simonsen, Aarhus C (DK); Morten Daugaard Andersen, Aarhus C (DK)

(73) Assignee: AAK AB (PUBL), Malmö (SE)

( * ) Notice: Subject to any disclaimer, the term of this patent is extended or adjusted under 35 U.S.C. 154(b) by 170 days.

(21) Appl. No.: 18/838,423

(22) PCT Filed: Feb. 23, 2023

(86) PCT No.: PCT/SE2023/050160

§ 371 (c)(1),
(2) Date: Aug. 14, 2024

(87) PCT Pub. No.: WO2023/163640

PCT Pub. Date: Aug. 31, 2023

(65) Prior Publication Data

US 2025/0234881 A1 Jul. 24, 2025

(30) Foreign Application Priority Data

Feb. 25, 2022 (SE) .................................... 2250256-1

(51) Int. Cl.
*A23G 1/38* (2006.01)
*A23G 3/40* (2006.01)

(52) U.S. Cl.
CPC ................. *A23G 1/38* (2013.01); *A23G 3/40* (2013.01)

(58) Field of Classification Search
CPC ................ A23G 1/38; C11C 3/02; C11C 3/10
See application file for complete search history.

(56) References Cited

U.S. PATENT DOCUMENTS

2011/0166227 A1 7/2011 Perlman et al.

FOREIGN PATENT DOCUMENTS

| | | | |
|---|---|---|---|
| EP | 0093602 | A2 | 11/1983 |
| WO | 2013132284 | A1 | 9/2013 |
| WO | 2014141904 | A1 | 9/2014 |
| WO | 2015150405 | A1 | 10/2015 |
| WO | 2020178180 | A1 | 9/2020 |

OTHER PUBLICATIONS

Jin, J. et al., "Characteristics of palm mid-fractions produced from different fractionation paths and their potential usages," International Journal of Food Properties, vol. 21, No. 1, pp. 58-69 (2018).

International Search Report for International Application No. PCT/SE2023/050160 dated Apr. 11, 2023 (4 pages).

Written Opinion of the International Searching Authority for International Application No. PCT/SE2023/050160 dated Apr. 11, 2023 (7 pages).

Biswas et al., "Physicochemical Properties of Enzymatically Produced Palm-Oil-Based Cocoa Butter Substitute (CBS) With Cocoa Butter Mixture," European Journal of Lipid Science and Technology, 120 (2018).

Lipp et al., "Review of cocoa butter and alternative fats for use in chocolate—Part A. Compositional data," Food Chemistry, 62(1):73-97 (1998).

Quast et al., "Physical properties of tempered mixtures of cocoa butter, CBR and CBS fats," International Journal of Food Science & Technology, 48:1579-1588 (2013).

*Primary Examiner* — Michele L Jacobson

(74) *Attorney, Agent, or Firm* — Finnegan, Henderson, Farabow, Garrett & Dunner LLP

(57) ABSTRACT

Disclosed is a fat composition comprising different triglycerides where at least 1% by weight is MMM triglycerides compared to the total weight of triglycerides. The invention also relates to use of a non-trans fat composition as a cocoa butter replacer and further to uses of the fat composition in different applications. The fat composition is preferably of non-animal origin, for example of vegetable origin, chemically synthesized and/or synthesized by cultivation.

18 Claims, No Drawings

NON-TRANS FAT COMPOSITION WITH IMPROVED BLOOM STABILITY, GLOSS, AND MELTDOWN

The present application is a national stage entry of PCT/SE2023/050160, filed Feb. 23, 2023, which claims priority to Swedish Application No. 2250256-1, filed Feb. 25, 2022. The entire contents of each application are hereby incorporated by reference.

TECHNICAL FIELD OF THE INVENTION

The present invention relates to a fat composition comprising different triglycerides where at least 1% by weight is MMM triglycerides compared to the total weight of triglycerides. The invention also relates to use of a non-trans fat composition as a CBR and further to uses of the fat composition in different applications. The fat composition is preferable of non-animal origin, for example of vegetable origin, chemically synthesized and/or synthesized by cultivation.

BACKGROUND OF THE INVENTION

Increasing global transformation from high-trans cocoa butter replacer (CBR) to low/no-trans CBR due to legislations will be a big challenge for confectionery producers of high-trans CBR, especially to limit/eliminate trans containing applications while maintaining the good properties of such products. Moreover, the customers who already switched from a high-trans CBR to a low-trans CBR solution seems not to be fully satisfied with the different solutions from fat and oil producers.

Using high-trans CBR has the advantages of a short setting time, high gloss, high cocoa butter (CB) tolerance, and a non-lauric product (i.e. the fatty acids do not contain lauric acid), while it has the obvious disadvantage of a high trans-unsaturated fatty acids content.

Using low-trans (or non-trans) CBR has the advantage of low to no trans-unsaturated fatty acid content, but there are some disadvantages. Disadvantages with the current best of the marketed non-trans CBRs are longer setting time, short bloom-stability, and loss of gloss particularly at lower temperatures. Apart from this, such solutions have higher solids at temperatures above 35° C., which contributes to a waxy taste.

Thus, there is a need for a non-trans fat composition with improved bloom stability, gloss, and meltdown. Accordingly, the main object of the invention is to provide such a composition.

SUMMARY OF THE INVENTION

The present invention solves the above-mentioned problems by the provision of a fat composition relating to the field of compound fat and particularly to a compound fat composition with improved bloom-stability, gloss, and meltdown.

The fat composition of the invention tackles the above-mentioned problems in the way that using the fat composition of the invention, bloom stability, and gloss of chocolate-like compounds were improved at temperatures below 20° C. Apart from this, the meltdown of chocolate-like compounds was improved in such a way that it is less waxy.

Disclosed herein in a first aspect is a fat composition comprising:

from 4% to 50% by weight of C14-fatty acids compared to the total weight of fatty acids;

from 40% to 95% by weight of saturated fatty acids compared to the total weight of fatty acids;

at least 1% by weight MMM triglycerides compared to the total weight of triglycerides;

a ratio of the weight of C14-fatty acids to the total weight of C12- and C14-fatty acids between 0.40 and 1.00;

from 15% to 70% by weight of the sum of SatSatO and SatOSat triglycerides compared to the total weight of triglycerides; and a ratio of the weight of SatOSat triglycerides to the weight of SatSatO triglycerides between 1.0 and 7.9;

wherein Sat is saturated fatty acids selected from C16-, C18-, C20-, C22-, and/or C24-fatty acids, and wherein O is oleic acid (C18:1) and M is myristic acid (C14:0).

Disclosed herein in a second aspect is a use of a fat composition according to the first aspect for bakery, dairy, or confectionary applications, or in coating or enrobing for nuts, bakery or confectionary applications, such as bakery or confectionary application selected from biscuit, cake, muffin, donut, pastry, or bread applications; or in fillings, such as bakery fillings and confectionary fillings; or for chocolate and chocolate-like coatings; or for chocolate or chocolate-like spreads, which are spreadable at room temperature.

Disclosed herein in a third aspect is a confectionary or chocolate or chocolate-like product comprising between 25% and 70% by weight, such as between 25% and 60%, such as between 25% and 50%, such as between 25% and 40%, such as between 28% and 40% by weight of a fat composition according to the first aspect.

Disclosed herein in a fourth aspect is the use of a fat composition as a CBR, the fat composition comprising:

from 4% to 50% by weight of C14-fatty acids compared to the total weight of fatty acids;

from 40% to 95% by weight of saturated fatty acids compared to the total weight of fatty acids;

at least 1% by weight MMM triglycerides compared to the total weight of triglycerides;

a ratio of the weight of C14-fatty acids to the total weight of C12- and C14-fatty acids between 0.40 and 1.00;

from 15% to 70% by weight of the sum of SatSatO and SatOSat triglycerides compared to the total weight of triglycerides; and a ratio of the weight of SatOSat triglycerides to the weight of SatSatO triglycerides between 1.0 and 7.9;

wherein the fat composition is a non-trans fat composition; and wherein Sat is saturated fatty acids selected from C16-, C18-, C20-, C22-, and/or C24-fatty acids, and wherein O is oleic acid (C18:1) and M is myristic acid (C14:0).

Disclosed herein in a fifth aspect is the use of a non-trans fat composition as a CBR, the fat composition comprising:

from 4% to 50% by weight of C14-fatty acids compared to the total weight of fatty acids;

from 40% to 95% by weight of saturated fatty acids compared to the total weight of fatty acids;

at least 1% by weight MMM triglycerides compared to the total weight of triglycerides;

a ratio of the weight of C14-fatty acids to the total weight of C12- and C14-fatty acids between 0.40 and 1.00;

from 15% to 70% by weight of the sum of SatSatO and SatOSat triglycerides compared to the total weight of triglycerides; and a ratio of the weight of SatOSat triglycerides to the weight of SatSatO triglycerides between 1.0 and 7.9;

wherein Sat is saturated fatty acids selected from C16-, C18-, C20-, C22-, and/or C24-fatty acids, and wherein O is oleic acid (C18:1) and M is myristic acid (C14:0).

Disclosed herein in a sixth aspect is a CBR fat composition comprising:

from 4% to 50% by weight of C14-fatty acids compared to the total weight of fatty acids;

from 40% to 95% by weight of saturated fatty acids compared to the total weight of fatty acids;

at least 1% by weight MMM triglycerides compared to the total weight of triglycerides;

a ratio of the weight of C14-fatty acids to the total weight of C12- and C14-fatty acids between 0.40 and 1.00;

from 15% to 70% by weight of the sum of SatSatO and SatOSat triglycerides compared to the total weight of triglycerides; and a ratio of the weight of SatOSat triglycerides to the weight of SatSatO triglycerides between 1.0 and 7.9;

wherein the CBR fat composition is a non-trans fat composition; and wherein Sat is saturated fatty acids selected from C16-, C18-, C20-, C22-, and/or C24-fatty acids, and wherein O is oleic acid (C18:1) and M is myristic acid (C14:0).

Definitions

As used herein, the term "vegetable" shall be understood as originating from a plant. Thus, vegetable fat or vegetable triglycerides are still to be understood as vegetable fat or vegetable triglycerides if all the fatty acids used to obtain said triglyceride or fat is of plant origin.

Saturated fatty acids (SAFA) are chains of carbon atoms joined by single bonds, with the maximum number of hydrogen atoms attached to each carbon atom in the chain. Unsaturated fatty acids are chains of carbon atoms joined by single bonds and varying numbers of double bonds, which do not have their full quota of hydrogen atoms attached. A double bond may exhibit one of two possible configurations: trans or cis. In trans configuration (a trans fatty acid), the carbon chain extends from opposite sides of the double bond, whereas, in cis configuration (a cis fatty acid), the carbon chain extends from the same side of the double bond. The trans fatty acid is a straighter molecule. The cis fatty acid is a bent molecule.

In this application, "Sat" means a subgroup of saturated fatty acid. The saturated fatty acid referred to herein as "Sat" are the saturated fatty acid selected from C16-, C18-, C20-, C22-, and/or C24-fatty acids. The fatty acids, which are comprised in the triglycerides of formulae SatSatO, SatOSat, etc. and referred to in the ratio of SatSatO to SatOSat, may be identical or different, saturated fatty acids. O is oleic acid, which is an unsaturated fatty acid.

Using the terminology that a value is in a range, such as when stating that A is between X and Y, means that both values X and Y are also included in the range. Such ranges are seen as disclosed similar to a range stating that A is in an amount from X to Y. An example from the description could be that the ratio of the weight of C14-fatty acids to the total weight of C12- and C14-fatty acids between 0.40 and 1.00, means that both 0.40 and 1.00 are included in the range from 0.40 to 1.00, hereby disclosing all numbers in such range with both endpoints included. This is meant for all ranges disclosed herein unless specifically stated otherwise.

Using the nomenclature CX means that the fatty acid comprises X carbon atoms, e.g. a C14-fatty acid has 14 carbon atoms while a C16-fatty acid has 16 carbon atoms.

Using the nomenclature CX:Y means that the fatty acid comprises X carbon atoms and Y double bonds, e.g. a C14:0 fatty acid has 14 carbon atoms and 0 double bonds while a C18:1 fatty acid has 18 carbon atoms and 1 double bond.

A ratio of the weight of C14-fatty acids to the total weight of C12- and C14-fatty acids means that the weight of C14-fatty acids is divided by the sum of weights of C12 and C14-fatty acids (C14/(C12+C14)).

SatSatO is an asymmetrical di-saturated triglyceride comprising two saturated fatty acids and one oleic acid (an unsaturated fatty acid) in an asymmetrical isomer, and wherein SatOSat is a symmetrical di-saturated triglyceride comprising two saturated fatty acids and one oleic acid in a symmetrical isomer.

A ratio of the weight of SatOSat triglycerides to the weight of SatSatO triglycerides means that the weight of SatOSat triglycerides is divided by the weight of SatSatO triglycerides (SatOSat/SatSatO).

The SatOSat/SatSatO ratio may be measured/calculated in the composition. A ratio of SatOSat to SatSatO means that the weight of SatOSat-triglycerides is divided by the weight of SatSatO-triglycerides (SatOSat/SatSatO), where Sat means a saturated fatty acid, and O means an oleic acid. SatSatO is an asymmetrical di-saturated triglyceride in which a saturated fatty acid occupies the sn1 and sn2 positions, and an oleic acid occupies the sn3 position; or a saturated fatty acid occupies the sn2 and sn3 positions, and an oleic acid occupies the sn1 position. SatOSat is a symmetrical di-saturated triglyceride in which a saturated fatty acid occupies the sn1 and sn3 positions, and an oleic acid occupies the sn2 position.

Sn1/sn2/sn3:

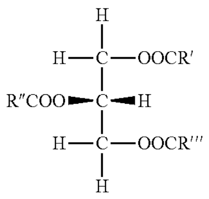

position sn-1
position sn-2
position sn-3

Fischer projection of a natural L-glycerol derivative.

In general, triglycerides use a "sn" notation, which stands for stereospecific numbering. In a Fischer projection of a natural L-glycerol derivative, the secondary hydroxyl group is shown to the left of C-2; the carbon atom above this then becomes C-1 and the carbon atom below this becomes C-3. The prefix 'sn' is placed before the stem name of the compound.

As used herein, "%" or "percentage" relates to weight percentage i.e. wt. % or wt.-% if nothing else is indicated.

As used herein, "oil" and "fat" are used interchangeably, unless otherwise specified.

As used herein, "vegetable oil" and "vegetable fat" are used interchangeably, unless otherwise specified.

As used herein the term "single cell oil" shall mean oil from oleaginous microorganisms which are species of yeasts, molds (fungal), bacteria and microalgae. These single cell oils are produced intracellular and in most cases during the stationary growth phase under specific growth conditions (e.g. under nitrogen limitation with simultaneous excess of a carbon source). Examples of oleaginous microorganisms are, but not limited to, *Mortierella alpineea, Yarrowia lipolytica, Schizochytrium, Nannochloropsis, Chlorella, Crypthecodinium cohnii, Shewanella.*

As used herein "cocoa butter replacer" (CBR) is intended to mean an edible fat having a triglyceride composition significantly different to cocoa butter. Cocoa butter replacers can have from high to low and even no trans fatty acids in its triglyceride composition. Cocoa butter replacers are only mixable with cocoa butter in medium to small ratios. Furthermore, in contrast to chocolate, cocoa butter replacer-based compounds do not need to undergo a treatment at different temperatures, known as tempering, prior to molding, coating, or enrobing in order to obtain a final product with acceptable shelf life.

By compound is meant a product made from a combination of cocoa butter and (vegetable) fats. A compound may also comprise milk fat in various amounts. It is used as a lower-cost alternative to true chocolate, as it uses less-expensive hard (vegetable) fats in place of the more expensive cocoa butter. It may also be known as "compound coating" or "chocolatey coating" when used as a coating for confectionary or candy.

Palm Mid Fraction (PMF) is produced by multiple fractionations of palm oil. Its main characteristic is a very high content in symmetrical di-saturated triglycerides (mainly POP). In the present disclosure Palm Mid Fraction and PMF is used interchangeably.

As used herein "edible" is something that is suitable for use as food or as part of a food product, such as a dairy or confectionary product.

For products and methods in the confectionery areas, reference is made to "Chocolate, Cocoa and Confectionery", B. W. Minifie, Aspen Publishers Inc., 3. Edition 1999.

A food product is a product for human consumption. Important groups of products are those where cocoa butter and cocoa butter-like fats are used.

By a chocolate or chocolate-like product is meant a product, which at least is experienced by the consumer as chocolate or as a confectionery product having sensorial attributes common with chocolate, such as e.g. melting profile, taste etc. Some chocolate comprises cocoa butter, typically in substantial amounts, where some chocolate-like product may be produced with a low amount of or even without cocoa butter, e.g. by replacing the cocoa butter with a cocoa butter equivalent, cocoa butter substitute, etc. In addition, many chocolate or chocolate-like products comprise cocoa powder or cocoa mass, although some chocolate or chocolate-like products, such as typical white chocolates, may be produced without cocoa powder, but e.g. drawing its chocolate taste from cocoa butter. Depending on the country and/or region there may be various restrictions on which products may be marketed as chocolate.

The term "comprising" or "to comprise" is to be interpreted as specifying the presence of the stated parts, steps, features, or components, but does not exclude the presence of one of more additional parts, steps, features, or components.

As used herein, the term "and/or" is intended to mean the combined ("and") and the exclusive ("or") use, i.e. "A and/or B" is intended to mean "A alone, or B alone, or A and B together".

By a "randomly interesterified fat blend", is meant a fat blend, where the triglycerides in said fat blend have been subjected to a random interesterification step, i.e., randomly interesterified. Randomly interesterified means that the fatty acids are randomly rearranged in triglyceride structures without changing the fatty acid profile, until equilibrium point of reaction is reached. Accordingly, the triglyceride profile of randomly interesterified fat blends can be calculated by probability laws from their fatty acid composition.

Interesterification should be understood as replacing one or more of the fatty acid moieties of a triglyceride with another fatty acid moiety or exchanging one or more fatty acid moieties from one triglyceride molecule to another. A fatty acid moiety may be understood as a free fatty acid, a fatty acid ester, a fatty acid anhydride, an activated fatty acid and/or the fatty acyl part of a fatty acid. The term "trans-esterification" may be used interchangeably with "interesterification". The interesterification process may be an enzymatic interesterification or chemical interesterification. Both chemical interesterification and enzymatic interesterification is described well in the art. Both chemical and enzymatic interesterification may be done by standard procedures and depending on the choice they may be performed either randomly or site specific.

DETAILED DESCRIPTION OF THE INVENTION

When describing the below embodiments, the present invention envisages all possible combinations and permutations of the below described embodiments with the above disclosed aspects.

The invention relates to a fat composition comprising:
- from 4% to 50% by weight of C14-fatty acids compared to the total weight of fatty acids;
- from 40% to 95% by weight of saturated fatty acids compared to the total weight of fatty acids;
- at least 1% by weight MMM triglycerides compared to the total weight of triglycerides;
- a ratio of the weight of C14-fatty acids to the total weight of C12- and C14-fatty acids between 0.40 and 1.00;
- from 15% to 70% by weight of the sum of SatSatO and SatOSat triglycerides compared to the total weight of triglycerides; and
- a ratio of the weight of SatOSat triglycerides to the weight of SatSatO triglycerides between 1.0 and 7.9;

wherein Sat is saturated fatty acids selected from C16-, C18-, C20-, C22-, and/or C24-fatty acids, and wherein O is oleic acid (C18:1) and M is myristic acid (C14:0).

In one or more embodiments, the fat composition is a non-trans fat composition.

The invention also relates to use of a fat composition (as disclosed herein) as a CBR.

The invention also relates to use of a fat composition (as disclosed herein) as a CBR imparting improved bloom-stability, gloss, and melt-down.

Hence, the invention relates to the use of a fat composition as a CBR, the fat composition comprising:
- from 4% to 50% by weight of C14-fatty acids compared to the total weight of fatty acids;
- from 40% to 95% by weight of saturated fatty acids compared to the total weight of fatty acids;
- at least 1% by weight MMM triglycerides compared to the total weight of triglycerides;
- a ratio of the weight of C14-fatty acids to the total weight of C12- and C14-fatty acids between 0.40 and 1.00;
- from 15% to 70% by weight of the sum of SatSatO and SatOSat triglycerides compared to the total weight of triglycerides; and
- a ratio of the weight of SatOSat triglycerides to the weight of SatSatO triglycerides between 1.0 and 7.9;
- wherein the fat composition is a non-trans fat composition; and
- wherein Sat is saturated fatty acids selected from C16-, C18-, C20-, C22-, and/or C24-fatty acids, and wherein O is oleic acid (C18:1) and M is myristic acid (C14:0).

The invention also relates to use of a non-trans fat composition as a CBR, the fat composition comprising:

- from 4% to 50% by weight of C14-fatty acids compared to the total weight of fatty acids;
- from 40% to 95% by weight of saturated fatty acids compared to the total weight of fatty acids;
- at least 1% by weight MMM triglycerides compared to the total weight of triglycerides;
- a ratio of the weight of C14-fatty acids to the total weight of C12- and C14-fatty acids between 0.40 and 1.00;
- from 15% to 70% by weight of the sum of SatSatO and SatOSat triglycerides compared to the total weight of triglycerides; and
- a ratio of the weight of SatOSat triglycerides to the weight of SatSatO triglycerides between 1.0 and 7.9;
- wherein Sat is saturated fatty acids selected from C16-, C18-, C20-, C22-, and/or C24-fatty acids, and wherein O is oleic acid (C18:1) and M is myristic acid (C14:0).

In one or more embodiments, the use of a non-trans fat composition as a CBR is for imparting improved bloom-stability, gloss and melt-down of a product. Such product could be a confectionary or chocolate or chocolate-like product.

That is, the invention also relates to use of a non-trans fat composition as a CBR imparting improved bloom-stability, gloss, and melt-down of a product, such as a confectionary or chocolate or chocolate-like product, the fat composition comprising:

- from 4% to 50% by weight of C14-fatty acids compared to the total weight of fatty acids;
- from 40% to 95% by weight of saturated fatty acids compared to the total weight of fatty acids;
- at least 1% by weight MMM triglycerides compared to the total weight of triglycerides;
- a ratio of the weight of C14-fatty acids to the total weight of C12- and C14-fatty acids between 0.40 and 1.00;
- from 15% to 70% by weight of the sum of SatSatO and SatOSat triglycerides compared to the total weight of triglycerides; and
- a ratio of the weight of SatOSat triglycerides to the weight of SatSatO triglycerides between 1.0 and 7.9;
- wherein Sat is saturated fatty acids selected from C16-, C18-, C20-, C22-, and/or C24-fatty acids, and wherein O is oleic acid (C18:1) and M is myristic acid (C14:0).

The fat composition is preferable of non-animal origin, for example of vegetable origin, chemically synthesized and/or synthesized by cultivation.

In one embodiment, the fat composition does not contain animal fat.

In one embodiment, the fat composition is of vegetable origin.

As can be seen from the examples, bloom stability and gloss of chocolate-like compounds were improved at temperatures below 20° C. when using the fat composition of the invention.

In addition, the meltdown of chocolate-like compounds has improved in such a way that it is less waxy.

In one or more embodiments, Sat is saturated fatty acids selected from C16- and C18-fatty acids.

In one or more embodiments, the C14-fatty acids are saturated fatty acids (C14:0). A C14:0 fatty acid is also known as myristic acid.

In one or more embodiments, the fat composition comprises from 5% to 40% by weight of C14-fatty acids compared to the total weight of fatty acids, such as from 5% to 35%, such as from 5% to 30%, such as from 6% to 30%, such as from 6% to 25%, such as from 6% to 20%, such as from 8% to 20%, or such as from 10% to 20% by weight of C14-fatty acids compared to the total weight of fatty acids.

By from 5% to 40% by weight of C14-fatty acids compared to the total weight of fatty acids is meant that between 5% and 40% of the total weight of fatty acids in the triglycerides of the fat composition is from C14-fatty acids.

In one or more embodiments, the fat composition comprises from 45% to 95% by weight of saturated fatty acids compared to the total weight of fatty acids, such as from 45% to 90%, such as from 50% to 90%, such as from 55% to 90%, such as from 60% to 90%, such as from 60% to 85%, such as from 60% to 80%, such as from 60% to 75%, or such as from 65% to 75% by weight of saturated fatty acids compared to the total weight of fatty acids.

By from 45% to 95% by weight of saturated fatty acids compared to the total weight of fatty acids is meant that between 45% and 95% of the total weight of fatty acids in the triglycerides of the fat composition is saturated fatty acids. Saturated fatty acids are chains of carbon atoms joined by single bonds, with the maximum number of hydrogen atoms attached to each carbon atom in the chain, in accordance with the above definitions.

In one or more embodiments, the fat composition comprises at least 2% by weight MMM triglycerides compared to the total weight of triglycerides, such as at least 3% by weight, or such as at least 4% by weight MMM triglycerides compared to the total weight of triglycerides. M is myristic acid (C14:0).

In one or more embodiments, the fat composition comprises from 1% to 20% by weight MMM triglycerides compared to the total weight of triglycerides, such as from 2% to 16% by weight, or such as from 3% to 14% by weight MMM triglycerides compared to the total weight of triglycerides. In one or more embodiments, the fat composition comprises from 4% to 11% by weight MMM triglycerides compared to the total weight of triglycerides.

In one or more embodiments, the fat composition comprises 10% or less by weight of C12-fatty acids compared to the total weight of fatty acids. In one or more embodiments, the fat composition comprises 5% or less, such as 2% or less, or such as 1% or less by weight of C12-fatty acids compared to the total weight of fatty acids.

In one or more embodiments, the ratio of the weight of C14-fatty acids to the total weight of C12- and C14-fatty acids is between 0.45 and 1.00, such as between 0.50 and 1.00, such as between 0.60 and 1.00, such as between 0.70 and 1.00, or such as between 0.80 and 1.00.

In one or more embodiments, the fat composition comprises from 20% to 70% by weight of the sum of SatSatO and SatOSat triglycerides compared to the total weight of triglycerides, such as from 30% to 65%, such as from 30% to 60%, such as from 40% to 60%, or such as from 50% to 60% by weight of the sum of SatSatO and SatOSat triglycerides compared to the total weight of triglycerides.

By from 20% to 70% by weight of the sum of SatSatO and SatOSat triglycerides compared to the total weight of triglycerides is meant that the total amount of SatSatO and SatOSat triglycerides is between 20% and 70% of the total weight of triglycerides of the fat composition.

In one or more embodiments, the ratio of the weight of SatOSat triglycerides to the weight of SatSatO triglycerides in the fat composition is between 1.0 and 6.0, such as between 1.0 and 5.0, such as between 1.0 and 4.0, such as between 1.0 and 3.5, or such as between 1.0 and 3.0.

In one or more embodiments, the fat composition is not originating from a single cell organism.

In one or more embodiments, the fat composition is a cocoa butter replacer (CBR).

In one or more embodiments, the fat composition comprises at least a triglyceride composition comprising fatty acids randomly distributed on a glycerol backbone, a middle fraction of a randomly interesterified fat blend, and a palm mid fraction composition.

In one or more embodiments, the triglyceride composition is comprised in an amount from 5% to 50% by weight compared to the total weight of the fat composition. By the triglyceride composition being in an amount from 5% to 50% by weight compared to the total weight of the fat composition is meant that between 5% and 50% of the total weight of the fat composition is from the triglyceride composition.

In one or more embodiments, the middle fraction of a randomly interesterified fat blend is comprised in an amount from 50% to 95% by weight compared to the total weight of the fat composition. By the middle fraction of a randomly interesterified fat blend being in an amount from 50% to 95% by weight compared to the total weight of the fat composition is meant that between 50% and 95% of the total weight of the fat composition is from the middle fraction of a randomly interesterified fat blend.

In one or more embodiments, the palm mid fraction composition is comprised in an amount from 10% to 70% by weight compared to the total weight of the fat composition.

The fat composition composed of at least a triglyceride composition comprising fatty acids randomly distributed on a glycerol backbone, a middle fraction of a randomly interesterified fat blend, and a palm mid fraction composition can be obtained by any combination of mixing the three components.

In one or more embodiments, the total amount of the fat composition comprising at least a triglyceride composition comprising fatty acids randomly distributed on a glycerol backbone, the middle fraction of a randomly interesterified fat blend, and the palm mid fraction composition is equal to 100, as exemplified by the below embodiments.

In one or more embodiments, the triglyceride composition comprising fatty acids randomly distributed on a glycerol backbone comprises:

- from 0% to 30% by weight of C12-fatty acids compared to the total weight of fatty acids in the triglyceride composition comprising fatty acids randomly distributed on a glycerol backbone;
- from 40% to 90% by weight of C14-fatty acids compared to the total weight of fatty acids in the triglyceride composition comprising fatty acids randomly distributed on a glycerol backbone;
- from 0% to 40% by weight of the sum of saturated C16-, C18-, C20-, C22-, C24-fatty acids compared to the total weight of fatty acids in the triglyceride composition comprising fatty acids randomly distributed on a glycerol backbone; and
- from 50% to 100% by weight of saturated fatty acids compared to the total weight of fatty acids in the triglyceride composition comprising fatty acids randomly distributed on a glycerol backbone.

In one or more embodiments, the triglyceride composition comprising fatty acids randomly distributed on a glycerol backbone comprises 25% by weight or less of saturated C12-fatty acids compared to the total weight of fatty acids in the triglyceride composition comprising fatty acids randomly distributed on a glycerol backbone, such as 20% by weight or less, of saturated C12-fatty acids compared to the total weight of fatty acids in the triglyceride composition comprising fatty acids randomly distributed on a glycerol backbone.

In one or more embodiments, the triglyceride composition comprising fatty acids randomly distributed on a glycerol backbone comprises from 45% to 80% by weight of C14-fatty acids compared to the total weight of fatty acids in the triglyceride composition comprising fatty acids randomly distributed on a glycerol backbone, such as from 50% to 80%, such as from 55% to 80%, by weight of C14-fatty acids compared to the total weight of fatty acids in the triglyceride composition comprising fatty acids randomly distributed on a glycerol backbone.

In one or more embodiments, the triglyceride composition comprising fatty acids randomly distributed on a glycerol backbone comprises from 0% to 30% by weight of the sum of saturated C16-, C18-, C20-, C22-, C24-fatty acids compared to the total weight of fatty acids in the triglyceride composition comprising fatty acids randomly distributed on a glycerol backbone, such as from 0% to 25% by weight of the sum of saturated C16-, C18-, C20-, C22-, C24-fatty acids compared to the total weight of fatty acids in the triglyceride composition comprising fatty acids randomly distributed on a glycerol backbone.

In one or more embodiments, the triglyceride composition comprising fatty acids randomly distributed on a glycerol backbone comprises from 60% to 100% by weight of saturated fatty acids compared to the total weight of fatty acids in the triglyceride composition comprising fatty acids randomly distributed on a glycerol backbone, such as from 70% to 100%, or such as from 75% to 100% by weight of saturated fatty acids compared to the total weight of fatty acids in the triglyceride composition comprising fatty acids randomly distributed on a glycerol backbone.

In one or more embodiments, the middle fraction of a randomly interesterified fat blend is based on palm- and shea-oil fractions. The middle fraction of randomly interesterified fat blend based on palm and shea fractions can be obtained from palm oil, palm oil fractions, shea oil, shea oil fractions, or combinations thereof. The middle fraction of randomly interesterified fat blend based on palm and shea fractions comprises, but not limited to, e.g. triglycerides of which from 1% to 5% by weight is selected from StOSt and StStO, from 13% to 18% by weight is selected from POSt and PStO, from 42% to 45% by weight is selected from POP and PPO, from 60% to 66% by weight is selected from SatOSat, SatSatO, or combinations thereof, and wherein the ratio of SatSatO to SatOSat is in a range from 1.8 to 2.2; wherein Sat is a saturated fatty acid selected from St (stearic acid), P (palmitic acid), or combinations thereof.

In one or more embodiments, the fat composition is rich in myristic acid. By rich in myristic acid is meant that the composition is having a myristic acid content close to that of coconut oil. Among vegetable fats and oils, a particularly rich source of myristic acids is coconut oil having 17 g of myristic acid/100 g of oil.

In one or more embodiments, the fat composition is a non-trans fat composition. By non-trans is meant that 1% or less of the total weight of fatty acids in the triglycerides of the fat composition is from trans-unsaturated fatty acids.

In one or more embodiment, the fat composition is a non-trans fat composition wherein less than 1% of the total weight of fatty acids in the triglycerides of the fat composition is from trans-unsaturated fatty acids, such as less than 0.8%, such as less than 0.6%, such as less than 0.5%, or such as less than 0.2% of the total weight of fatty acids in the triglycerides of the fat composition is from trans-unsaturated fatty acids.

In one or more embodiments, the fat composition is non-hydrogenated.

Hydrogenation is a process where unsaturated fatty acids are made partially saturated. Non-hydrogenated means not hydrogenated or un-hydrogenated. By subjecting unsaturated fatty acids to a process of hydrogenation (e.g. involving a combination of catalysts, hydrogen, and heat), the double bond opens, and hydrogen atoms bind to the carbon atoms, hereby saturating the double bond. While most of the unsaturated oil will either remain as was (on its double bond structure) or be converted to the corresponding saturated fatty acid, some of the double bonds may open during the hydrogenation process and then re-close in another double bond configuration, hereby converting a cis fatty acid to a trans fatty acid, or vice versa. A non-hydrogenated fat composition is a composition comprising only non-hydrogenated fatty acids, meaning that the process of hydrogenation has not been performed on the fatty acids in said composition.

The fat composition, which is a non-hydrogenated fat composition, is a fat composition, which maintains a clean label.

In one or more embodiments, the fat composition is a non-hydrogenated and non-trans fat composition.

The invention also relates to the use of the fat composition according to the present invention for bakery, dairy, or confectionary applications.

Disclosed is also the use of the fat composition according to the present invention for coating or enrobing for nuts, bakery, or confectionary applications.

By nuts is meant culinary edible nuts like hazelnuts, Brazil nuts, walnuts, pecans, macadamia, and almonds. The bakery or confectionary application can be selected from biscuit, cake, muffin, donut, pastry, or bread applications.

Also disclosed is the use of the fat composition according to the present invention in fillings, such as bakery fillings and confectionary fillings. The bakery or confectionary can be selected from biscuit, cake, muffin, donut, pastry, or bread applications.

Further disclosed is the use of the fat composition according to the present invention for chocolate and chocolate-like coatings; or for chocolate or chocolate-like spreads, which are spreadable at room temperature.

The invention also relates to a confectionary, chocolate, or chocolate-like product comprising between 25% and 70% by weight, such as between 25% and 60%, such as between 25% and 50%, such as between 25% and 40%, or such as between 28% and 40% by weight of a fat composition according to the present invention.

In one or more embodiments where the fat composition is for use in confectionary or chocolate-like products, said confectionary or chocolate-like product comprises between 0.1% and 2% sorbitan tristearate (STS). In another embodiment, said confectionary or chocolate-like product does not comprise sorbitan tristearate (STS).

When describing the embodiments, the combinations and permutations of all possible embodiments have not been explicitly described. Nevertheless, the mere fact that certain measures are recited in mutually different dependent claims or described in different embodiments does not indicate that a combination of these measures cannot be used to advantage. The present invention envisages all possible combinations and permutations of the described embodiments.

The present invention is further illustrated by the following examples, which are not to be construed as limiting the scope of protection.

EXAMPLES

Compound fat compositions of the invention are consisted of an esterification product (Fat A, Fat B, or Fat C), a middle fraction of a randomly interesterified fat blend based on palm and shea fractions (Fat D) and palm middle fraction with an iodine value of 33 (Fat E).

The middle fraction of randomly interesterified fat blend based on palm and shea fractions is obtained from palm oil, palm oil fractions, shea oil, shea oil fractions, or combinations thereof.

The middle fraction of randomly interesterified fat blend based on palm and shea fractions comprises triglycerides of which: 3% by weight is selected from StOSt and StStO; 17.5% by weight is selected from POSt and PStO; 43.7% by weight is selected from POP and PPO; 64.2% by weight is selected from SatOSat, SatSatO, or combinations thereof; the ratio of SatSatO/SatOSat is in a range from 1.8 to 2.2; wherein Sat is a saturated fatty acid selected from St (stearic acid), P (palmitic acid), or combinations thereof.

The triglycerides and fatty acids used in the examples are of vegetable origin, hence the referral to vegetable fat.

Example 1

Esterification of Glycerol with Free Fatty Acids

Glycerol and fatty acids were mixed to provide the reaction mixture according to Table 1. The reaction mixture was placed in a 6 L three-necked flask, equipped with a vacuum inlet, a cold trap, and a condenser heated to 70° C. The reaction mixture was heated to 170° C. within 30 minutes under reduced pressure of approximately 100-150 mbar. The reaction mixture was kept at 170-180° C. for 7 hours where the pressure was reduced stepwise to 33 mbar as the reaction time progressed. The temperature was then raised to 210° C. Once the temperature reached 210° C., the reaction mixture was held for 2 hours. Excess free fatty acids from the reaction mixture were distilled off at 240° C. under reduced pressure. The final vegetable fat composition was obtained once the crude oil was bleached, filtered and deodorized.

Solid fat content (SFC) is a measure of the percentage of fat in crystalline (solid) phase to total fat (the remainder being in liquid phase) across a temperature gradient. In theory, SFC values can be any number from 0 to 100; however, due to detection limits of the instrument used in the method in effect the boundaries are around 0.5 to 98.

Table 1 shows the feed composition, free fatty acid composition, and solid fat content (SFC) of the triglyceride compositions of the esterification products.

The fatty acid composition of vegetable fat compositions is analyzed using IUPAC 2.301 (Methylation) and IUPAC 2.304 (GLC). The solid fat content (SFC) is measured according to IUPAC 2.150a.

TABLE 1

| Esterification product | A | B | C |
|---|---|---|---|
| Glycerol (g) | 342.0 | 179.0 | 128.0 |
| 99% Lauric acid (g) | 738.0 | — | — |
| 99% Myristic acid (g) | 2936.0 | 1127.0 | 1098.0 |
| 98% Palmitic acid (g) | — | 112.5 | 275.0 |

TABLE 1-continued

| Esterification product | A | B | C |
|---|---|---|---|
| 98% Stearic acid (g) | — | 185.5 | — |
| 82% Oleic acid (g) | — | 431.5 | — |
| Free fatty acids (%) | 0.2 | 0.3 | 0.2 |
| Monoglycerides (%) | 0.0 | 0.0 | 0.1 |
| Diglycerides (%) | 1.1 | 3.6 | 3.8 |
| Triglycerides (%) | 97.8 | 95.5 | 95.6 |
| Fatty acid composition of the esterification product | | | |
| C12:0 (% w/w) | 19.5 | — | 0.1 |
| C14:0 (% w/w) | 79.8 | 59.5 | 76.8 |
| C16:0 (% w/w) | 0.2 | 6.5 | 22.8 |
| C18:0 (% w/w) | 0.2 | 11.0 | 0.1 |
| C18:1 (% w/w) | 0.2 | 19.5 | — |
| C18:2 (% w/w) | — | 2.9 | — |
| C20:0 (% w/w) | — | 0.2 | — |
| C20:1 (% w/w) | — | — | — |
| Other fatty acids (% w/w) | 0.1 | 0.4 | 0.2 |
| SAFA (% w/w) | 100 | 77.2 | 100 |

TABLE 1-continued

| Esterification product | A | B | C |
|---|---|---|---|
| Sum C16:0 to C24:0 (% w/w) | 0.4 | 17.7 | 22.9 |
| Ratio C14/(C12 + C14) | 0.8 | 1.0 | 1.0 |
| Solid fat content (SFC) | | | |
| SFC (10° C.) | 98.7 | 91.4 | 98.8 |
| SFC (20° C.) | 98.2 | 82.1 | 98.4 |
| SFC (25° C.) | 98.1 | 70.0 | 98.4 |
| SFC (30° C.) | 97.8 | 53.6 | 97.6 |
| SFC (35° C.) | 95.1 | 34.0 | 97.4 |
| SFC (40° C.) | 74.2 | 10.5 | 95.7 |

Example 2

Table 2 displays fatty acid composition and solid fat content of the vegetable fat compositions after mixture according to the amounts in the table. FG1 is Akopol™ NH 53 and FG2 is a modified FG1.

TABLE 2

| | A1 | A2 | A3 | B1 | B2 | B3 | C1 | C2 | C3 | FG1 | FG2 |
|---|---|---|---|---|---|---|---|---|---|---|---|
| Vegetable fat comp. | | | | | | | | | | | |
| Esterification product A (% w/w) | 20 | 20 | 20 | 0 | 0 | 0 | 0 | 0 | 0 | 0 | 0 |
| Esterification product B (% w/w) | 0 | 0 | 0 | 20 | 20 | 20 | 0 | 0 | 0 | 0 | 0 |
| Esterification product C (% w/w) | 0 | 0 | 0 | 0 | 0 | 0 | 20 | 20 | 20 | 0 | 0 |
| Fat comp. D* (% w/w) | 80 | 70 | 60 | 80 | 70 | 60 | 80 | 40 | 30 | 90 | 40 |
| Fat comp. E** (% w/w) | 0 | 10 | 20 | 0 | 10 | 20 | 0 | 40 | 50 | 0 | 50 |
| Fat comp. F*** (% w/w) | 0 | 0 | 0 | 0 | 0 | 0 | 0 | 0 | 0 | 10 | 10 |
| Fatty acid comp. | | | | | | | | | | | |
| C12:0 (% w/w) | 4 | 4 | 3.9 | 0.2 | 0.2 | 0.2 | 0.2 | 0.2 | 0.2 | 4.2 | 4.1 |
| C14:0 (% w/w) | 16.2 | 16.2 | 16.1 | 12.5 | 12.4 | 12.4 | 16.8 | 15.6 | 15.5 | 2.5 | 2.4 |
| C16:0 (% w/w) | 43.1 | 43.4 | 43.5 | 45.6 | 44.7 | 44.9 | 46.1 | 48.5 | 48.7 | 50.5 | 51.6 |
| C18:0 (% w/w) | 9 | 8.6 | 8.3 | 10.2 | 10.6 | 10.3 | 8.6 | 7.5 | 7.1 | 10.1 | 8.2 |
| C18:1 (% w/w) | 22.6 | 23 | 23.5 | 26 | 26.5 | 26.9 | 23.2 | 24.0 | 24.5 | 26.2 | 28.5 |
| C18:2 (% w/w) | 3.9 | 3.7 | 3.5 | 4.2 | 4.2 | 4.0 | 3.9 | 3.1 | 3.0 | 4.6 | 3.5 |
| C20:0 (% w/w) | 0.5 | 0.4 | 0.4 | 0.4 | 0.5 | 0.5 | 0.4 | 0.4 | 0.4 | 0.5 | 0.5 |
| C20:1 (% w/w) | 0.1 | 0.0 | 0.0 | 0.1 | 0.1 | 0.1 | 0.2 | 0.0 | 0.0 | 0.1 | 0.0 |
| Other fatty acids (% w/w) | 0.6 | 0.7 | 0.8 | 0.8 | 0.8 | 0.7 | 0.6 | 0.7 | 0.6 | 1.3 | 1.2 |
| Trans fatty acids (% w/w) | <1 | <1 | <1 | <1 | <1 | <1 | <1 | <1 | <1 | <1 | <1 |
| SAFA (% w/w) | 72.9 | 72.7 | 72.3 | 69 | 68.5 | 68.4 | 72.8 | 72.3 | 72 | 68.3 | 67.3 |
| Ratio C14/(C12 + C14) | 0.80 | 0.80 | 0.80 | 0.98 | 0.98 | 0.98 | 0.99 | 0.99 | 0.99 | 0.37 | 0.37 |
| Sum of SatSatO and SatOSat (% w/w) | 50.4 | 52.1 | 53.8 | 50.4 | 52.1 | 53.8 | 50.4 | 57.2 | 58.9 | 57.2 | 65.7 |
| Ratio SatOSat/SatSatO**** | 0.50 | 0.73 | 1.02 | 0.5 | 0.73 | 1.02 | 0.50 | 1.93 | 2.68 | 0.50 | 2.23 |
| Solid fat content (SFC) of vegetable fat composition | | | | | | | | | | | |
| SFC (10° C.) | 94 | 94.1 | 94.6 | 93.6 | 93.9 | 94 | 94.1 | 94.9 | 94.5 | 91.4 | 92.6 |
| SFC (20° C.) | 88 | 86.6 | 86.1 | 85.1 | 84.4 | 83.1 | 89.1 | 89 | 88.3 | 82.8 | 77.4 |
| SFC (25° C.) | 68.7 | 64.8 | 60.7 | 63.1 | 59.5 | 56.5 | 73.9 | 68.2 | 67.1 | 58.9 | 46.4 |
| SFC (30° C.) | 40.8 | 38.2 | 33.9 | 40 | 36.6 | 33.5 | 53.7 | 41.5 | 38.1 | 33 | 19.3 |
| SFC (35° C.) | 14 | 11.6 | 9.1 | 16.6 | 14.5 | 12.1 | 26.6 | 15.6 | 13.2 | 13.7 | 4.6 |
| SFC (40° C.) | <0.5 | <0.5 | <0.5 | 1.0 | <0.5 | <0.5 | 5.4 | <0.5 | <0.5 | 1.3 | <0.5 |

*middle fraction of a randomly interesterified fat blend based on palm and shea fractions

**palm middle fraction, IV 33

***a randomly interesterified fat blend based on palm oil, palm kernel oil and fractions thereof.

****Where Sat is selected from saturated fatty acids C16:0-C24:0 and O is oleic acid The fatty acid composition of vegetable fat compositions is analysed using IUPAC 2.301 (Methylation). The triglyceride composition of vegetable fat compositions is analysed using AOCS Ce 5b-89. The solid fat content (SFC) is measured according to IUPAC 2.150a.

As can be seen from the results of table 2, the vegetable fat compositions A2, A3, B2, B3, C2, and C3 with higher StOSat/SatSatO ratio (as compared to A1, B1 and C1, respectively) which are comprising additional palm middle fraction (IV 33) (Fat comp. E) have a lower solid fat content at elevated temperatures of 35° C. and 40° C. Hence, chocolate-like compounds made with such fat compositions are expected to be less waxy compared to chocolate-like compounds made with fat compositions without the added palm mid fraction, i.e. A1, B1, and C1.

Addition of up to 50% PMF to fat composition C1 had significantly declined the SFC at both 35° C. and 40° C. without decreasing the SFC at 20° C. This means a significantly better melt down and possibly a maintained hardness for chocolate-like compounds made with fat composition C3 compared to C1. Additionally, significantly higher SFC at 25° C. and 30° C. for fat composition C3 compared to A3, B3 and FG1 may indicate a higher heat resistance for chocolate-like compounds made with the former compared to chocolate-like compounds made with the latter.

Example 3: Recipes and Manufacture of Dark Chocolate-Like Compounds

Table 3 displays the recipe for a dark chocolate-like compound.

TABLE 3

| Dark chocolate-like compound composition | |
|---|---|
| Vegetable fat (% w/w) | 34.30 |
| Cocoa powder (10-12% CB) (% w/w) | 15.00 |
| Sugar (% w/w) | 43.58 |
| Sorbitan tristearate (STS) (% w/w) | 0.70 |
| Skim milk powder (% w/w) | 6.00 |
| Lecithin (% w/w) | 0.40 |
| Vanillin | 0.02 |
| Total fat content (% w/w) | 36.70 |
| Fat composition distribution in the recipe | |
| Vegetable fat + STS (% w/w) | 95.30 |
| Cocoa butter (% w/w) | 4.50 |
| Milk fat (% w/w) | 0.20 |

Eleven different dark chocolate-like compounds were produced according to the recipe given in table 3 and using vegetable fat compositions A1, A2, A3, B1, B2, B3, C1, C2, C3, and the two references, FG1 and FG2, respectively.

All ingredients mentioned in the recipe except lecithin and some of the fats were mixed using a Hobart N-50 mixer at 65° C. for 10 minutes. They were then refined using a Bühler SDY-300 three-roll refiner (with 300 mm width) to a particle size of 20 microns. The refined product was added to the Hobart mixer bowl and conched for 6 hours at 65° C. After conching for 5.5 hours, lecithin was added and after 5.75 hours, the rest of the fat was added and conching were continued. The chocolate-like compounds produced were used for making 50 g tablets and for coating biscuits, which were subsequently cooled in a three-zone cooling tunnel with temperatures of 15° C., 12° C., and 15° C., respectively.

Example 4: Functionality Attributes of the Chocolate-Like Compounds

Crystallization Rate:

Biscuits were coated with the dark chocolate-like compounds made according to example 3. Coating of biscuits was performed at 45° C. in a Nielsen enrobing machine followed by cooling in a three-zone cooling tunnel at temperatures of 15° C., 12° C. and 15° C., respectively for specific cooling periods. The coated biscuits were evaluated immediately after the cooling period and scored 1, 2, 3 or 4 according to the below scoring scale:

1. The coating is still liquid on some parts of the biscuit, while other parts are semi solidified.
2. The whole coating is semi solidified, but very sticky and very soft. There are no liquid coating parts on the biscuit anymore.
3. The whole coating has solidified; however, the coating is still sticky, soft, and not ready for packaging.
4. The whole coating is hard and not sticky. It is possibly to pack the product.

Score 4 is the most important score as it indicates that the coated biscuits are ready for flow-packing.

Mould-Releasability:

The chocolate-like compounds made according to example 3 were transferred into 50 g grid moulds at 45° C. followed by cooling in a three-zone cooling tunnel with temperatures of 15° C., 12° C., and 15° C., respectively for 15 minutes. The tablets were immediately evaluated after the cooling period. Cooling was repeated for the tablets that were not 100% solidified and releasable from the mould. Mould-releasability was determined by counting the dry grids of the mould and expressing the results based on percentage of the dried grids out of the total grids of the mould.

Texture

The chocolate-like compound tablets produced according to example 3 were stored at temperature of 20° C. for a week before being measured for hardness using a TAX2 Plus texture analyser using a P2 needle and 3 mm penetration depth into the product. The tablets were penetrated until a standard deviation of below 5% was obtained (typically needed eight penetrations).

Bloom-Stability:

The coated biscuits and tablets made using the chocolate-like compounds produced according to example 3 were stored for a minimum of 3 days at 20° C. before being moved to cabinets with different temperatures of 15° C., 20° C. and 23° C. Bloom evaluations were made weekly and according to a scale from 1-10. Character 1 signifies heavy bloom and no gloss whereas character 10 signifies no bloom and high gloss. Character 4 marks the onset of a very weak bloom. Table 4 shows the results of the evaluations made.

TABLE 4

| | Chocolate-like compound | | | | | | | | | | |
|---|---|---|---|---|---|---|---|---|---|---|---|
| | I | II | III | IV | V | VI | VII | VIII | IX | X | XI |
| | Vegetable fat comp. | | | | | | | | | | |
| | A1 | A2 | A3 | B1 | B2 | B3 | C1 | C2 | C3 | FG1 | FG2 |
| Time takes to obtain a flow packable coated biscuit (a score of 4) (minutes) | | | | | | | | | | | |
| | 3 | 3 | 3 | 3 | 3 | 3 | 3 | 6 | 7 | 6 | >12 |
| % mould-releasability after 30 min | | | | | | | | | | | |
| | 100 | 100 | 97 | 95 | 93 | 93 | 100 | 100 | 100 | 62 | 0 |
| Texture (g) after 1 week at 20° C. | | | | | | | | | | | |
| | 451 | 491 | 480 | 454 | 449 | 472 | 669 | 579 | 572 | 415 | 331 |
| Bloom-stability of tablets (Weeks) | | | | | | | | | | | |
| 15° C. | >44 (8) | >44 (8) | >44 (8) | >40 (7) | >40 (7) | >40 (7) | >34 (8) | >34 (8) | >34 (4) | >40 (4) | 6 (3) |
| 20° C. | >44 (4) [37 (9)] | >44 (4) [37 (9)] | >44 (9) | >40 (8) | >40 (8) | >40 (8) | >34 (8) | >34 (7) | >34 (7) | >40 (7) | >12 (8) |
| Bloom-stability of coated biscuits (Weeks) | | | | | | | | | | | |
| 15° C. | 15 (3) | 15 (3) | >44 (4) [36 (7)] | 13 (3) | 24 (3) | >40 (7) | >34 (4) | >34 (4) | >34 (4) | 3 (3) | 4 (3) |
| 20° C. | >44 (8) | >44 (8) | >44 (8) | >40 (8) | >40 (8) | >40 (8) | >34 (8) | >34 (8) | >34 (4) | >40 (8) | >12 (8) |
| 23° C. | >44 (8) | >44 (8) | >44 (8) | >40 (7) | >40 (7) | >40 (7) | >34 (8) | >34 (7) | >34 (7) | >40 (8) | >12 (8) |

Results showed that biscuits coated with chocolate-like compounds III and VI comprising fat compositions A3 and B3, respectively with higher SatOSat/SatSatO ratio (as compared to A1 and A2 and B1 and B2, respectively) had significantly better bloom-stability at 15° C. Apart from that, tablets made with chocolate-like compound III comprising fat composition A3 maintained high gloss for a longer period at 20° C. compared to tablets made with chocolate-like compounds I and II comprising fat compositions A1 and A2, respectively.

Comparing chocolate-like compounds IX and XI comprising fat compositions C3 and FG2, respectively with 50% PMF in their fat composition and thus higher StOSat/SatSatO ratio (as compared to C1 and FG1, respectively) showed that both tablets and coated biscuits made with the chocolate-like compound comprising fat composition of invention (C3) had significantly better bloom-stability at 15° C.

Noteworthy is that addition of 20% PMF to fat compositions A1 and B1 and thus increasing the SatOSat/SatSatO ratio not only improved the SFC profile in terms of less solids specifically at 35° C. (which is reflected in the SFC profile of A3 and B3 fat compositions and thus the chocolate-like compounds made with such fat compositions are expected to possess a better melt-down and be less waxy) but also significantly improved bloom-stability of both tablets and coated biscuits made with chocolate-like compounds comprising such fat compositions specifically at 15° C. Apart from this, the time it takes to obtain flow-packable coated biscuits and the % mould-releasability are maintained surprisingly well. All in all, results showed that fat compositions of invention (A3 and B3) were able to promote significantly better functionalities (as compared to fat compositions A1, A2, B1 and B2) with respect to bloom-stability at 15° C. and melt-down without compromising other functionalities such as gloss, crystallization rate of coated biscuits, releasability of moulded tablets, and texture.

It is remarkable that addition of 50% PMF to fat composition C1 and thus increasing the SatOSat/SatSatO ratio even further promoted a better melt-down (less waxiness) of tablets and coated biscuits made with chocolate-like compound IX without compromising bloom-stability, mould-releasability and high texture. Moreover, all functionality attributes of chocolate-like compounds made with fat composition C3 of invention such as crystallization rate of coated biscuits, mould-releasability, texture and bloom-stability at 15° C. were superior to those of chocolate-like compound XI comprising fat composition FG2 (with the same amount of PMF in the fat composition).

The invention claimed is:

1. A method of making a cocoa butter replacer (CBR), the method comprising addition of a fat composition, the fat composition comprising:

from 4% to 50% by weight of C14-fatty acids compared to the total weight of fatty acids;

from 40% to 95% by weight of saturated fatty acids compared to the total weight of fatty acids;

at least 1% by weight MMM triglycerides compared to the total weight of triglycerides;

a ratio of the weight of C14-fatty acids to the total weight of C12- and C14-fatty acids between 0.40 and 1.00;

from 15% to 70% by weight of the sum of SatSatO and SatOSat triglycerides compared to the total weight of triglycerides; and a ratio of the weight of SatOSat triglycerides to the weight of SatSatO triglycerides between 1.0 and 7.9;

wherein the fat composition is a non-trans fat composition; and wherein Sat is saturated fatty acids selected from C16-, C18-, C20-, C22-, and/or C24-fatty acids, and wherein O is oleic acid (C18:1) and M is myristic acid (C14:0).

2. The method according to claim 1, wherein the fat composition comprises from 5% to 40% by weight of C14-fatty acids compared to the total weight of fatty acids.

3. The method according to claim 1, wherein the fat composition comprises from 45% to 95% by weight of saturated fatty acids compared to the total weight of fatty acids.

4. The method according to claim 1, wherein the fat composition comprises at least 2% by weight MMM triglycerides compared to the total weight of triglycerides.

5. The method according to claim 1, wherein the fat composition comprises from 1% to 20% by weight MMM triglycerides compared to the total weight of triglycerides.

6. The method according to claim 1, wherein the ratio of the weight of C14-fatty acids to the total weight of C12- and C14-fatty acids is between 0.45 and 1.00.

7. The method according to claim 1, wherein the fat composition comprises from 20% to 70% by weight of the sum of SatSatO and SatOSat triglycerides compared to the total weight of triglycerides.

8. The method according to claim 1, wherein the ratio of the weight of SatOSat triglycerides to the weight of SatSatO triglycerides in the fat composition is between 1.0 and 6.0.

9. The method according to claim 1, wherein the fat composition comprises at least a triglyceride composition comprising fatty acids randomly distributed on a glycerol backbone, a middle fraction of a randomly interesterified fat blend, and a palm mid fraction composition.

10. The method according to claim 9, wherein the triglyceride composition is comprised in an amount from 5% to 50% by weight compared to the total weight of the fat composition.

11. The method according to claim 9, wherein the middle fraction of a randomly interesterified fat blend is comprised in an amount from 50% to 95% by weight compared to the total weight of the fat composition.

12. The method according to claim 9, wherein the triglyceride composition comprising fatty acids randomly distributed on a glycerol backbone comprises:

from 0% to 30% by weight of C12-fatty acids compared to the total weight of fatty acids in the triglyceride composition comprising fatty acids randomly distributed on a glycerol backbone;

from 40% to 90% by weight of C14-fatty acids compared to the total weight of fatty acids in the triglyceride composition comprising fatty acids randomly distributed on a glycerol backbone;

from 0% to 40% by weight of the sum of saturated C16-, C18-, C20-, C22-, C24-fatty acids compared to the total weight of fatty acids in the triglyceride composition comprising fatty acids randomly distributed on a glycerol backbone; and from 50% to 100% by weight of saturated fatty acids compared to the total weight of fatty acids in the triglyceride composition comprising fatty acids randomly distributed on a glycerol backbone.

13. The method according to claim 9, wherein the middle fraction of a randomly interesterified fat blend is based on palm- and shea-oil fractions.

14. The method according to claim 1, wherein the fat composition is rich in myristic acid.

15. The method according to claim 1, wherein the fat composition is non-hydrogenated.

16. The method according to claim 1, wherein the triglycerides and fatty acids of said composition are of vegetable origin, chemically synthesized and/or synthesized by cultivation.

17. The method according to claim 1, comprising providing the fat composition for bakery, dairy, or confectionary applications, or in coating or enrobing for nuts, bakery or confectionary applications; or in fillings.

18. A confectionary or chocolate or chocolate-like product comprising between 25% and 70% by weight of a fat composition, wherein the fat composition comprises:

from 4% to 50% by weight of C14-fatty acids compared to the total weight of fatty acids;

from 40% to 95% by weight of saturated fatty acids compared to the total weight of fatty acids;

at least 1% by weight MMM triglycerides compared to the total weight of triglycerides;

a ratio of the weight of C14-fatty acids to the total weight of C12- and C14-fatty acids between 0.40 and 1.00;

from 15% to 70% by weight of the sum of SatSatO and SatOSat triglycerides compared to the total weight of triglycerides; and a ratio of the weight of SatOSat triglycerides to the weight of SatSatO triglycerides between 1.0 and 7.9;

wherein the fat composition is a non-trans fat composition; and wherein Sat is saturated fatty acids selected from C16-, C18-, C20-, C22-, and/or C24-fatty acids, and wherein O is oleic acid (C18:1) and M is myristic acid (C14:0).

* * * * *